US012776197B2

(12) United States Patent
Rathinasamy et al.

(10) Patent No.: US 12,776,197 B2
(45) Date of Patent: Oct. 27, 2026

(54) MONITORING PHYSICAL ACCESS OF DEVICES USING LIGHT-BASED COMMUNICATIONS

(71) Applicant: Dell Products L.P., Round Rock, TX (US)

(72) Inventors: Shree Rathinasamy, Round Rock, TX (US); Maxim Balin, Gan-Yavne (IL); Yayun Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 18/464,453

(22) Filed: Sep. 11, 2023

(65) Prior Publication Data

US 2025/0087069 A1 Mar. 13, 2025

(51) Int. Cl.

| | |
|---|---|
| ***G08B 13/189*** | (2006.01) |
| ***G06F 21/86*** | (2013.01) |
| ***G06F 21/88*** | (2013.01) |
| ***G08B 13/184*** | (2006.01) |

(52) U.S. Cl.

CPC ......... *G08B 13/1895* (2013.01); *G06F 21/86* (2013.01); *G06F 21/88* (2013.01); *G08B 13/184* (2013.01)

(58) Field of Classification Search

CPC ....... G06F 21/86; G06F 21/88; G08B 13/184; G08B 13/1895

See application file for complete search history.

(56) References Cited

U.S. PATENT DOCUMENTS

| | | | | |
|---|---|---|---|---|
| 2004/0150958 | A1* | 8/2004 | Calhoon | G06F 1/18 361/725 |
| 2019/0371139 | A1* | 12/2019 | Engler | G06F 21/554 |
| 2021/0214968 | A1* | 7/2021 | Amuduri | G07C 9/00896 |
| 2022/0141239 | A1* | 5/2022 | Zaman | G06F 21/71 726/23 |
| 2025/0045469 | A1* | 2/2025 | Veshchikov | G06F 21/86 |

OTHER PUBLICATIONS

Haas, Harald, et al., "What is LiFI?." Journal of Lightwave Technology 34.6, pp. 1533-1544, Mar. 15, 2016.

* cited by examiner

*Primary Examiner* — Thomas J Dailey

(74) *Attorney, Agent, or Firm* — Ryan, Mason & Lewis, LLP

(57) ABSTRACT

Methods, apparatus, and processor-readable storage media for monitoring physical access of devices using light-based communications are provided herein. An example method includes monitoring, using at least one receiver positioned at least partially within a chassis of a device, at least one light-based signal that is transmitted from within the chassis of the device. The method also includes determining, based on the monitoring, whether at least one moveable part of the chassis is in a position that provides at least partial access to one or more hardware components located within the chassis, and initiating one or more automated actions to at least partially secure the device in response to a result of the determining.

20 Claims, 11 Drawing Sheets

MONITORING PHYSICAL ACCESS OF DEVICES USING LIGHT-BASED COMMUNICATIONS

BACKGROUND

Computing environments face different types of threats. These threats may concern, for example, software of the computing environments as well as the physical security of the computing environments. Challenges related to physical security of devices are often magnified in edge computing environments as access to such devices is more difficult to control, for example.

SUMMARY

Illustrative embodiments of the disclosure provide techniques for monitoring physical access of devices using light-based communications. An exemplary computer-implemented method includes monitoring, using at least one receiver positioned at least partially within a chassis of a device, at least one light-based signal that is transmitted from within the chassis of the device. The method also includes determining, based on the monitoring, whether at least one moveable part of the chassis is in a position that provides at least partial access to one or more hardware components located within the chassis, and initiating one or more automated actions to at least partially secure the device in response to a result of the determining.

Illustrative embodiments can provide significant advantages relative to conventional security techniques. For example, technical problems associated with monitoring access to devices are mitigated in one or more embodiments by detecting anomalies with a chassis of a device using light-based communications and proactively securing the device in response to such anomalies.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Physical security is an important aspect of modern computing environments. For example, edge computing environments are often highly distributed and decentralized, with devices and/or components deployed in locations that are vulnerable to physical security threats. Physical security threats can include theft, vandalism, and unauthorized access, which can compromise the availability and/or security of the computing environment. Physical security can be particularly challenging in situations where components (e.g., edge servers) are remotely located or located in areas that are easily accessible (e.g., factory floors, retail shops, colocation facilities, or network closets).

Some conventional techniques implement a mechanical switch in a chassis of a given device (e.g., an edge server) to provide additional security against intrusion. For example, such a switch can notify a user (e.g., a system administrator) in response to a cover of the chassis being opened or removed. Mechanical switches can be prone to false positives and/or provide unreliable notifications. For example, mechanical movement of the switch can become damaged over time, which can cause the switch to constantly indicate that the chassis remains closed even if it has been opened. Additionally, a malicious user may attempt to tape down the switch or press the switch (e.g., by inserting an object through one or more ventilation holes of the chassis) so that the switch does not transmit a notification when the chassis is opened.

One or more embodiments can at least partially mitigate such challenges by utilizing visible light communication (VLC) technology to implement a light-based intrusion detection mechanism.

Figure 1:
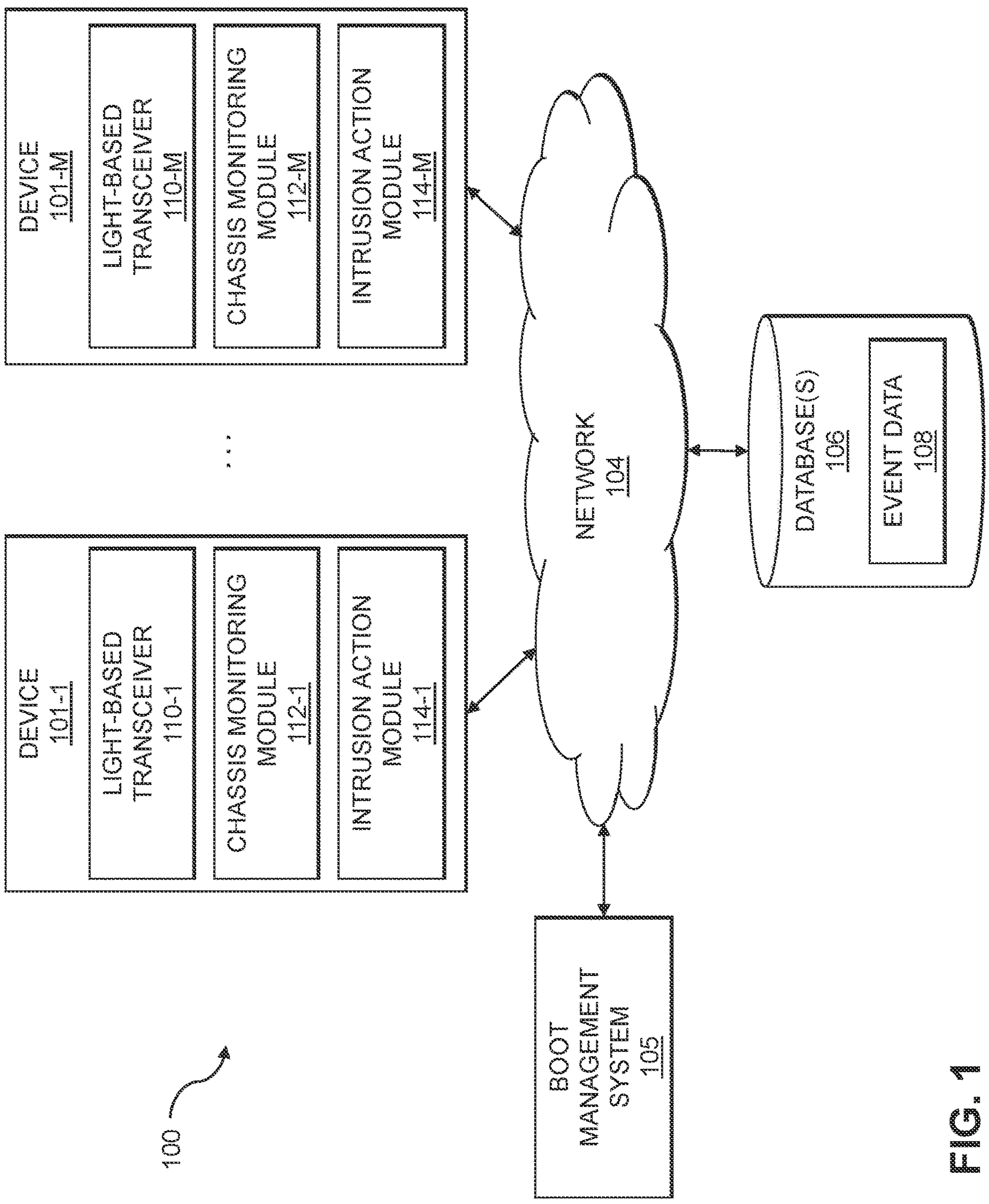
FIG. 1 shows an information processing system configured for monitoring physical access of devices using light-based communications in an illustrative embodiment.

FIG. 1 shows a computer network (also referred to herein as an information processing system) 100 configured in accordance with an illustrative embodiment. The computer network 100 comprises a plurality of devices 101-1 . . . 101-M (collectively referred to herein as devices 101) having respective light-based transceivers 110-1, . . . 110-M (collectively referred to herein as light-based transceivers 110), respective chassis monitoring modules 112-1, . . . 112-M (collectively referred to herein as chassis monitoring modules 112), and respective intrusion action modules 114-1, . . . 114-M (collectively referred to herein as intrusion action modules 114). The devices 101 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a boot management system 105.

The devices 101 and/or the boot management system 105 may comprise, for example, servers and/or portions of one or more server systems, as well as user devices such as computers or other types of computing devices. Such devices are examples of what are more generally referred to herein as "processing devices." Some of these processing devices are also generally referred to herein as "computers."

The devices 101 and/or the boot management system 105 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Figure 2:
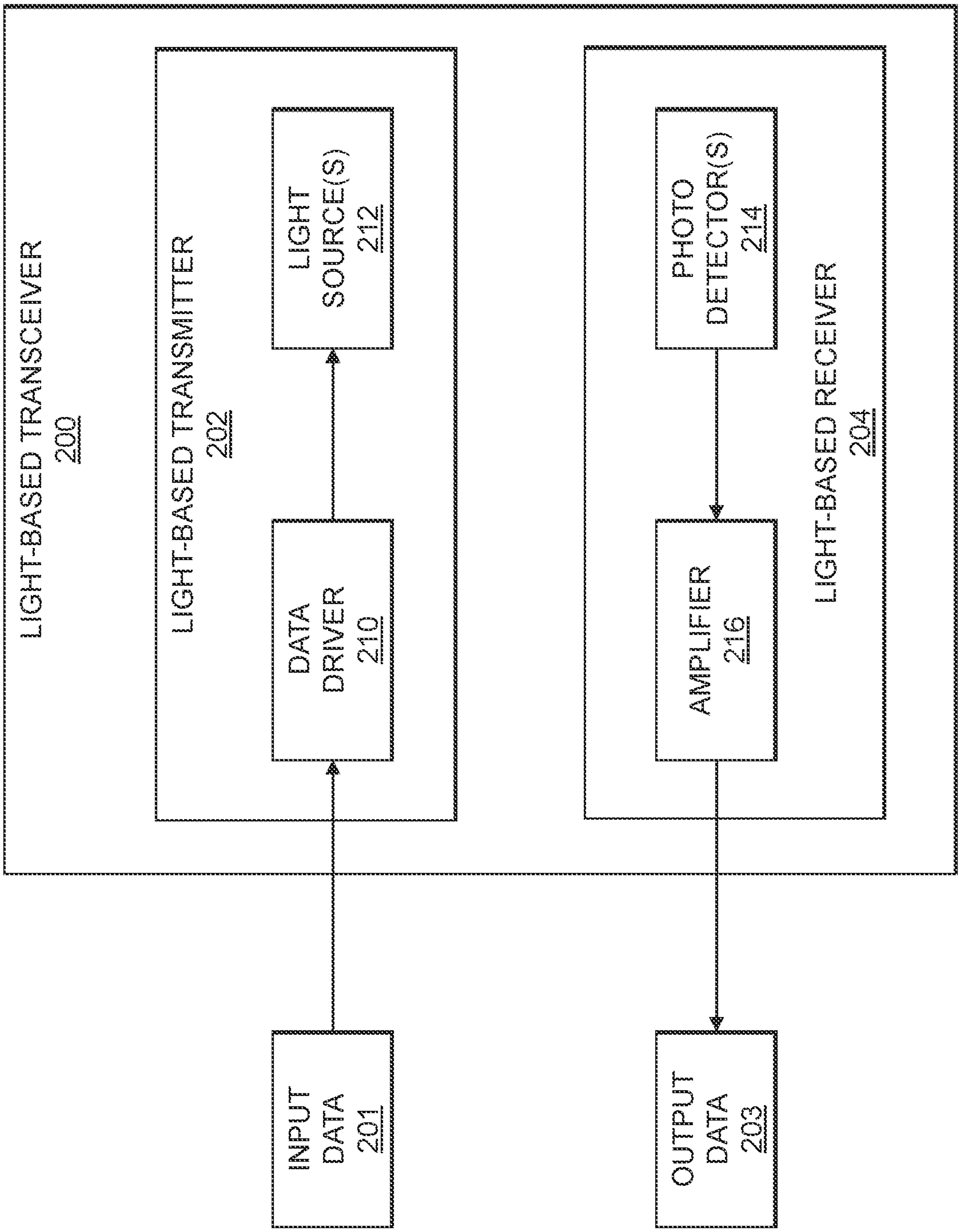
FIG. 2 shows an example of a light-based transceiver in an illustrative embodiment.

It is assumed that each of the light-based transceivers 110 in the FIG. 1 example comprise at least one light-based transmitter (TX) and at least one light-based receiver (RX), as described in more detail in conjunction with FIG. 2, for example. In some embodiments, the light-based transceivers 110 may comprise light fidelity (LiFi) transceivers that enable bidirectional wireless communications based on light. For example, each of the light-based transceivers 110 may comprise one or more light sources (e.g., LED and/or infrared light sources) that are used for such communications. It is generally assumed that a given light source emits light within one or more portions of the visible light spectrum, the infrared spectrum, and/or the ultraviolet spectrum. As a non-limiting example, some embodiments can utilize light having wavelengths between 380 nm to 780 nm. It is also assumed that the light-based transceivers 110 are implemented within a chassis of the corresponding devices 101 as described in more detail in conjunction with FIGS. 3A-7, for example.

The chassis monitoring modules 112 may be configured to monitor light signals associated with the light-based transceivers 110. For example, the chassis monitoring module 112-1 can monitor light signals transmitted by at least one TX of the light-based transceiver 110-1 and received by at least one corresponding RX of the light-based transceiver 110-1 to detect intrusion events, such as a cover of the chassis of the device 101-1 being at least partially opened, removed, or otherwise tampered with.

The intrusion action modules 114 may be configured to perform one or more automated actions responsive to intrusion detection events. For example, in response to the chassis monitoring module 112-1 detecting an intrusion event, the intrusion action module 114-1 can transmit a notification to the boot management system 105 and/or trigger the device 101-1 to enter a secure state. In some embodiments, the secure state can include automatically shutting down the device 101-1 and preventing the device 101-1 from booting or otherwise operating.

In some embodiments, the boot management system 105 can include functionality for validating the device 101-1 and/or providing approval for allowing the device 101-1 to exit the secure state so that it can be allowed to boot following an intrusion event.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a LiFi, Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the boot management system 105 can have at least one associated database 106 configured to store data pertaining to, for example, event data 108. The event data 108, in some embodiments, can include information associated with intrusion events detected by the chassis monitoring modules 112 of the devices 101, for example.

An example database 106, such as depicted in the present embodiment, can be implemented using one or more storage systems associated with the boot management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the devices 101 and/or boot management system 105 are one or more input-output devices, which illustratively comprise keyboards, displays or other types of input-output devices in any combination. Such input-output devices can be used, for example, to support one or more user interfaces to the boot management system 105 and/or the devices 101, as well as to support communication between boot management system 105 and/or the devices 101 and other related systems and devices not explicitly shown.

Additionally, each of the devices 101 and the boot management system 105 in the FIG. 1 embodiment is assumed to be implemented using at least one processing device. Each such processing device generally comprises at least one processor and an associated memory, and implements one or more functional modules for controlling certain features of the devices 101 and boot management system 105.

More particularly, the devices 101 and the boot management system 105 in this embodiment can comprise a processor coupled to a memory and one or more network interfaces.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The one or more network interfaces allow the boot management system 105 and the devices 101 to communicate over the network 104, for example. The one or more network interfaces illustratively comprise one or more conventional transceivers.

It is to be appreciated that this particular arrangement of elements 110, 112, and 114 illustrated in the devices 101 of the FIG. 1 embodiment is presented by way of example only, and alternative arrangements can be used in other embodiments. For example, the functionality associated with the elements 110, 112, and 114 in other embodiments can be combined into a single module, or separated across a larger number of modules. As another example, multiple distinct processors can be used to implement different ones of the elements 110, 112, and 114 or portions thereof.

At least portions of elements 110, 112, and 114 may be implemented at least in part in the form of software that is stored in memory and executed by a processor.

It is to be understood that the particular set of elements shown in FIG. 1 involving boot management system 105 and devices 101 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the boot management system 105, and the at least one database 106 can be on and/or part of the same processing platform. Also, in at least some embodiments, at least a portion of the boot management system 105 can be implemented on one or more of the devices 101.

An exemplary process utilizing elements 110-1, 112-1, and 114-1 of an example device 101-1 in computer network 100 will be described in more detail with reference to, for example, the flow diagrams of FIGS. 8-9.

FIG. 2 shows an example of a light-based transceiver 200 in an illustrative embodiment. In this example, the light-based transceiver 200 includes a light-based transmitter (TX) 202 and a light-based receiver (RX) 204. The light-based TX 202 includes a data driver 210 that obtains input data 201. Generally, the data driver 210 converts the input data 201 into a binary format so that it can be transmitted via one or more light sources 212. For example, the data driver 210 can implement one or more types of modulation schemes in order to transmit the input data 201. As non-limiting examples, at least one of the light sources 212 can be controlled to emit light having different intensity levels to indicate different values (e.g., a first intensity level can indicate a first binary value and a second intensity level can indicate a second binary value). In some examples, the different intensity levels are controlled so that the flickering of the light is not discernable by the human eye.

It is to be appreciated that the light-based transceiver 200 can be implemented in a LiFi system, which can utilize one or more types of modulation schemes (such as one or more types of single carrier modulation schemes and/or one or more types of multiple carrier modulation schemes). It is also to be appreciated that the one or more light sources 212, in some embodiments, can include overhead lighting and/or other types of lighting fixtures.

The light-based RX 204 includes one or more photo detectors 214 that are configured to detect and convert light emitted by one or more light sources 212 (e.g., of another light-based transceiver 200) into electrical signals. In some embodiments, an amplifier 216 can be configured to amplify, demodulate, and decode the electrical signals in order to recover data transmitted by a light-based TX, for example. The recovered data is then provided as output data 203.

Figure 3A:
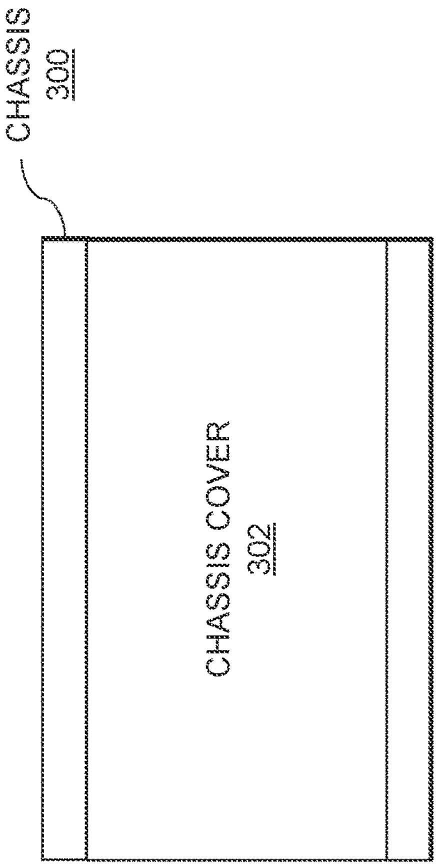
FIGS. 3A and 3B show top views of a chassis for a device in respective closed and open positions in an illustrative embodiment.
Figure 3B:
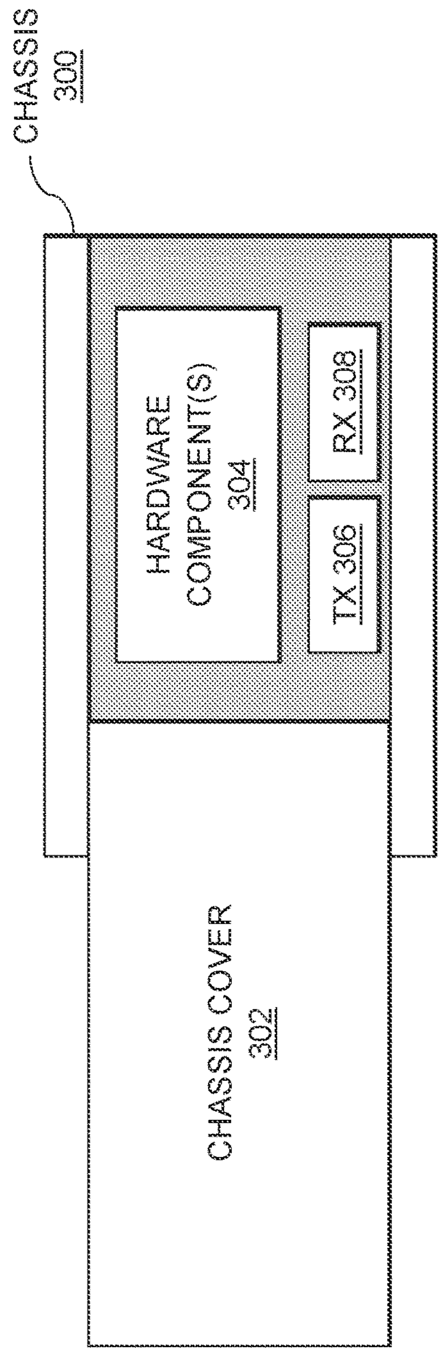

FIGS. 3A and 3B show top views of a chassis for a device in an illustrative embodiment. More specifically, FIG. 3A shows a top view of chassis 300, which includes a chassis cover 302. It is assumed that the chassis cover 302 can be removed to provide access to an interior space of the chassis 300. For example, the chassis cover 302 in FIG. 3B is shown in an open position, thus providing access to the interior space of the chassis 300 (as indicated by the dark shading). It is to be appreciated that the term "access" in this context and elsewhere herein is intended to be broadly construed so as to include, for example, different types of access including physical access and/or visual access.

In the example shown in FIG. 3B, the interior space of the chassis 300 includes one or more hardware components 304, a TX 306, and an RX 308. It is assumed that the TX 306 and the RX 308 correspond to a light-based TX (e.g., light-based TX 202) and a light-based RX (e.g., light-based RX 204), respectively. The one or more hardware components 304 can include, for example, one or more processors, one or more memories, one or more storage devices, one or more network interfaces, one or more fans, one or more power supply units, etc. It is to be appreciated that the chassis 300 is merely an example, and other types and configurations of chassis are also possible. For example, in other embodiments, a given chassis can include multiple chassis covers or panels, which can be partially moveable (e.g., a sliding cover or a cover that swings open via one or more hinges) and/or fully removable.

Figure 4:
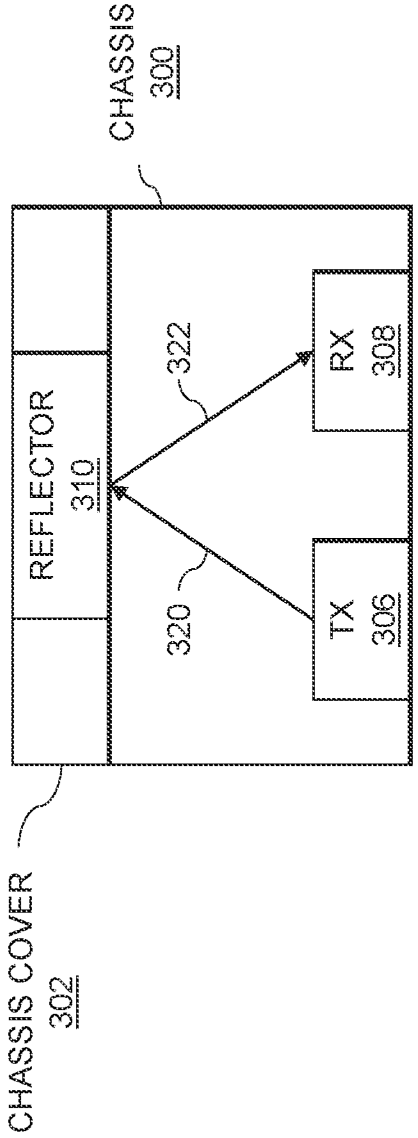
FIG. 4 shows a section view of a chassis for a device in a closed position in an illustrative embodiment.

FIG. 4 shows a section view of the chassis 300 in a closed position in an illustrative embodiment. In this example, it is assumed that a reflector 310 is attached and/or integrated into the chassis cover 302. The TX 306 transmits light-based signals 320 that can be reflected by the reflector 310. For example, the TX 306 and RX 308 can be located in disparate positions of the chassis 300, such that the light-based signals 320 from the TX 306 are reflected back to the RX 308 as reflected light-based signals 322 when the chassis 300 is in the closed position. Accordingly, the reflected light-based signals 322 can be used to determine that chassis cover 302 is in the closed position based at least in part on whether the light-based signals 322 are detected by the RX 308.

Figure 5:
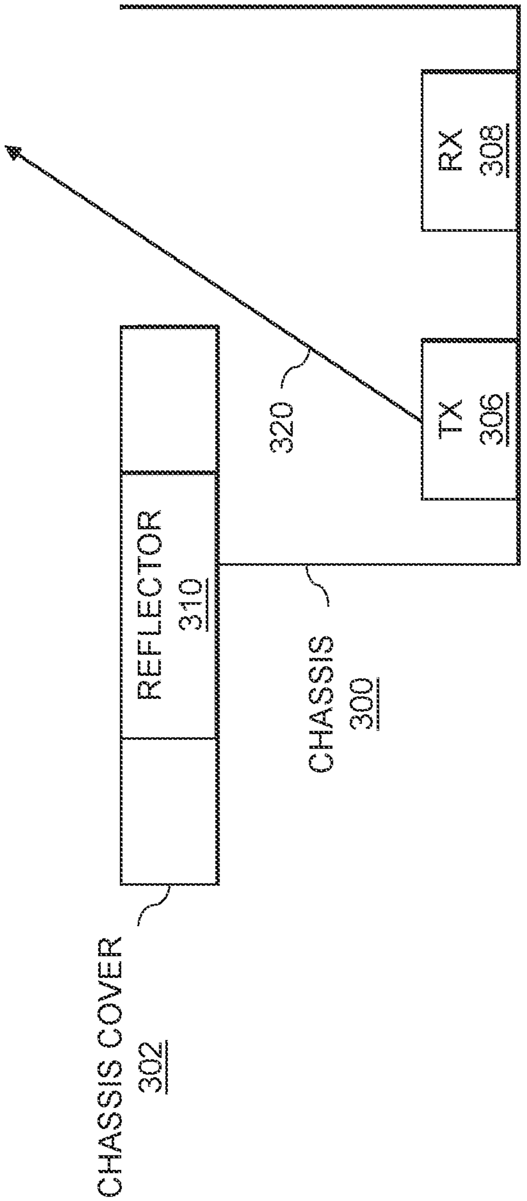
FIG. 5 shows a section view of the chassis in FIG. 4 in an open position in an illustrative embodiment.

FIG. 5 shows a section view of the chassis 300 in an open position in an illustrative embodiment. Unlike the example shown in FIG. 4, the light-based signals 320 are not aligned with the reflector 310, and thus the RX 308 does not detect the light-based signals 320. If this occurs, then it can be determined that the chassis cover 302 is in an open position.

It is to be appreciated that the term "open position" as used herein is intended to be broadly construed so as to encompass any arrangement of the chassis 300 where the RX 308 is unable to detect the reflected light-based signals 322.

Figure 6:
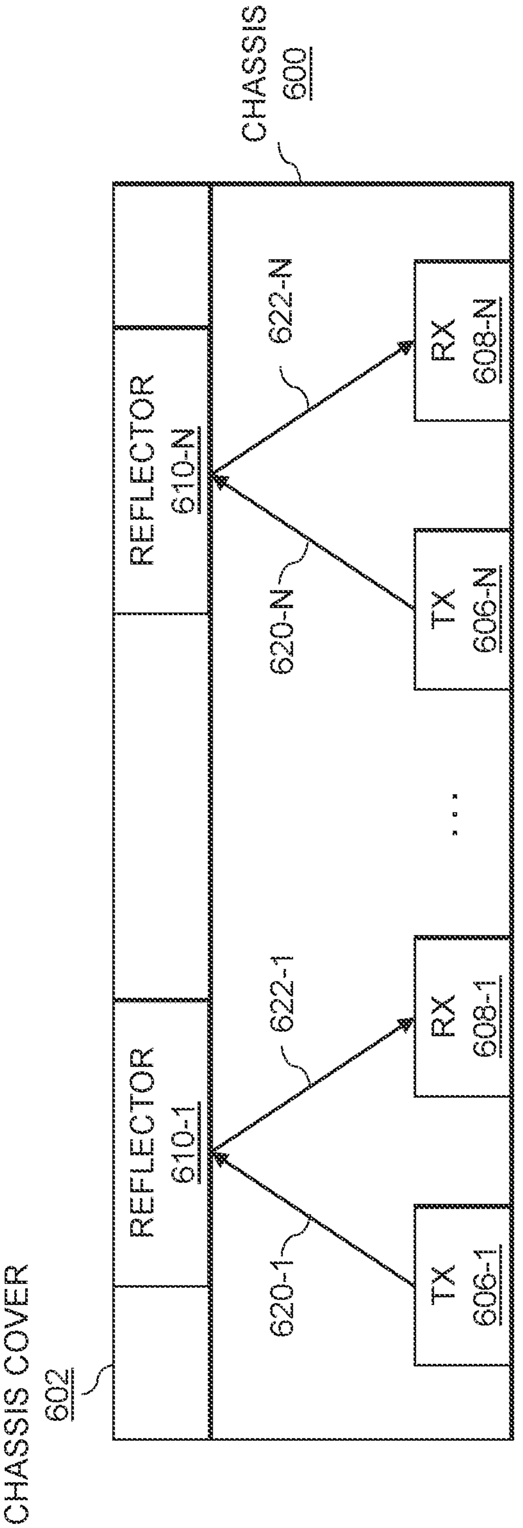
FIG. 6 shows a section view of another chassis for a device in a closed position in an illustrative embodiment.

FIG. 6 shows a section view of another chassis 600 for a device in a closed position in an illustrative embodiment. In this example, the chassis 600 comprises multiple TXs 606-1 . . . 606-N (collectively TXs 606), multiple RXs 608-1 . . . 608-N (collectively RXs 608), and multiple reflectors 610-1 . . . 610-N (collectively reflectors 610). In this example, it is assumed that the TXs 606 transmit respective light-based signals 620-1 . . . 620-N (collectively light-based signals 620) that are reflected off corresponding ones of the reflectors 610. The reflected light-based signals 622-1 . . . 622-N are detected by the RXs 608 when the chassis 600 is in the closed position. For example, TX 606-1 can be positioned such that the light-based signal 620-1 is reflected by the reflector 610-1. The RX 608-1 is positioned within the chassis 600 so that the RX 608-1 can detect the reflected light-based signal 622-1.

Figure 7:
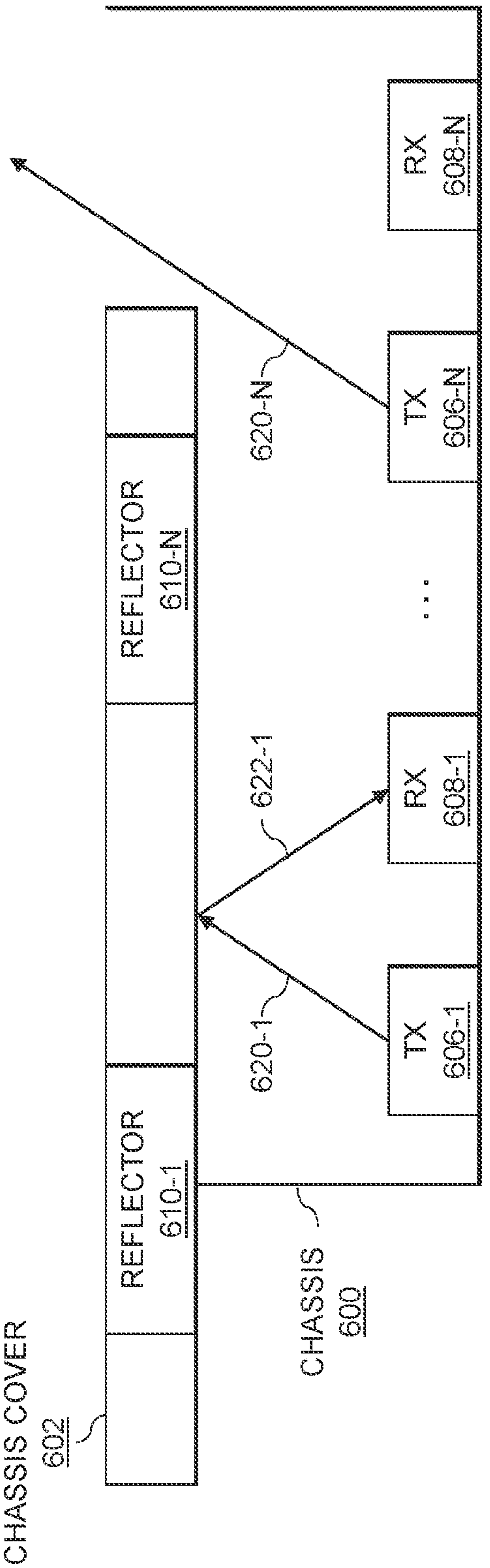
FIG. 7 shows a section view of the chassis in FIG. 6 in an open position in an illustrative embodiment.

FIG. 7 shows a section view of the chassis 600 in an open position in an illustrative embodiment. In this example, the chassis cover 602 is partially removed from the chassis 600, and the light-based signal 620-N escapes from the chassis 600. Accordingly, the RX 608-N does not detect the light-based signal 620-N transmitted by the TX 606-N. In some embodiments, it can be determined that the chassis 600 is in an open position (or a partially open position) when one of the RXs 608 fails to detect the light-based signals 620 transmitted by the corresponding TXs 606.

It is also noted that the light-based signal 620-1 transmitted by TX 606-1 in FIG. 7 is misaligned with the reflector 610-1. Depending on the material of the chassis cover 602, it is possible that the light-based signal 620-1 can still be detected by the RX 608-1 if it reflects off the chassis cover 602. In some embodiments, an anti-reflective material or coating can be applied to one or more portions of the chassis cover 602 in order to limit the positions of the chassis cover 602 from which the light-based signals 620 can reflect.

According to some embodiments, a controller (e.g., LiFi controller) can instruct one or more groups of light-based TXs to send a sequence of light-based signals comprising a code. As an example, a code can be automatically generated for a given device based on identifiers and/or characteristics of hardware components of the device. As an example, a code can be generated based on the serial numbers of hardware components (e.g., hardware components 304) of the device. For example, a code can be encoded into the light-based signal 620-1, and data received by RX 608-1 can be monitored and validated based on the transmitted data. If there is a break in the received data or if the received data is compromised (e.g., the received data does not include the correct code), then it can be determined that there is an anomaly with the chassis (e.g., an intrusion of the chassis 600). In response, one or more automated actions can be performed. For example, if the device is a server, then a notification can be sent to a baseboard management controller (BMC) to alert a user (e.g., an administrator). In one embodiment, the code can be updated in response to any changes being made to the hardware components of the device, so that the code remains consistent with the hardware components that are currently being implemented.

In one or more embodiments, a device can be an edge device in a remote location, and if an anomaly is detected, then the device can automatically enter a safe mode. For example, the safe mode can initiate an automatic shutdown of the device and prevent the device from booting or otherwise operating. In some embodiments, validation of the device and/or approval from an external system (e.g., boot management system 105) are needed before the device can exit the safe mode. Accordingly, such embodiments can provide a code controlled light-based mechanism that helps ensure the chassis cover remains in the expected position.

Figure 8:
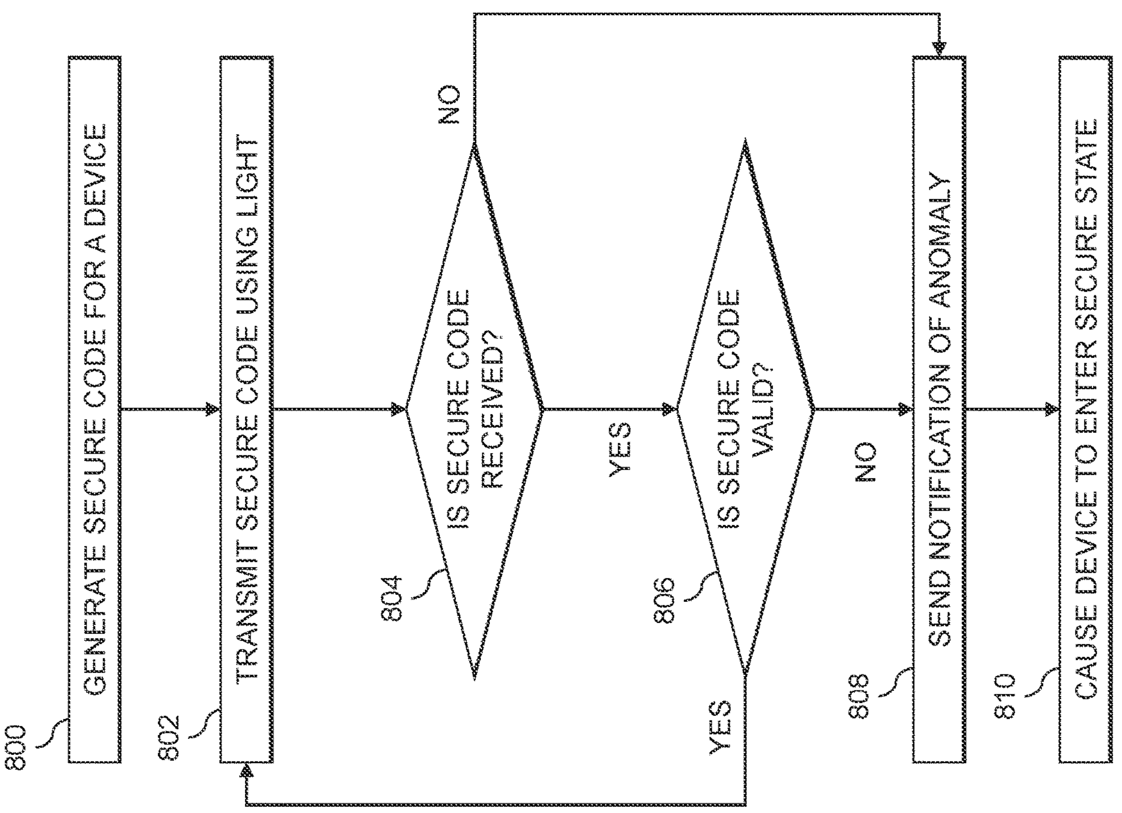
FIG. 8 shows an example of a chassis monitoring process in an illustrative embodiment.

FIG. 8 shows an example of a chassis monitoring process in an illustrative embodiment. It is to be understood that this particular process is only an example, and additional or alternative processes can be carried out in other embodiments.

Step 800 includes generating a secure code for a device. Step 802 includes transmitting the secure code using light. For example, the secure code can be encoded into a light-based signal and transmitted by a light-based TX (e.g., a LiFi TX). Step 804 includes a test to determine if the secure code is received. If yes, then the process continues to step 806.

Step 806 includes a test to determine if the received secure code is valid. For example, the secure code can be validated by checking that it matches the code transmitted by the light-based TX. If the secure code is valid, then the process returns to step 802.

If the result of step 804 or 806 is no, then step 808 is performed. Step 808 includes sending a notification of an anomaly (or performing another automated action). For example, the notification may be sent to a BMC to alert a user of the anomaly.

Step 810 includes causing the device to enter a secure state. The secure state may include, for example, automatically shutting down the device and preventing the device from booting until the device is validated by an external system and/or designated user.

Figure 9:
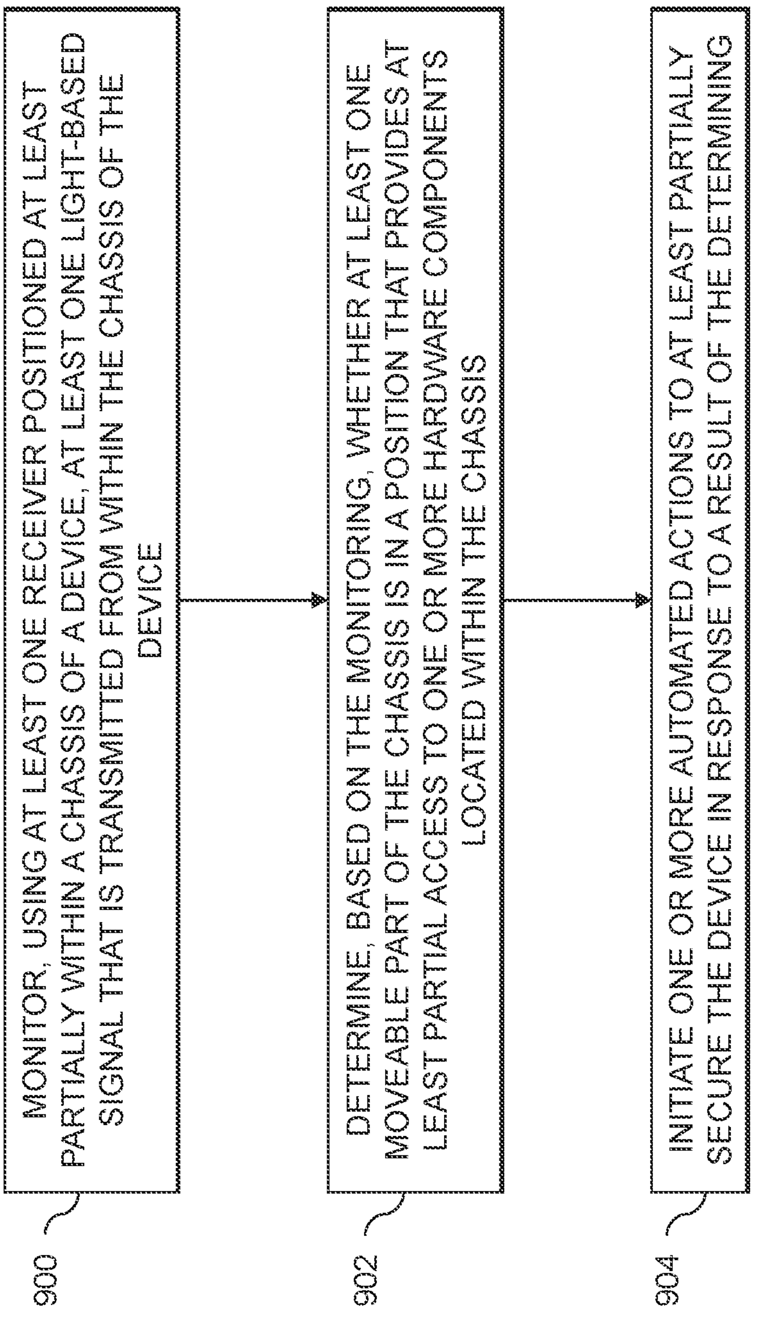
FIG. 9 shows a flow diagram of a process for monitoring physical access of devices using light-based communications in an illustrative embodiment.

FIG. 9 is a flow diagram of a process for monitoring physical access of devices using light-based communications in an illustrative embodiment. It is to be understood that this particular process is only an example, and additional or alternative processes can be carried out in other embodiments.

In this embodiment, the process includes steps 900 through 904. These steps are assumed to be performed by the device 101-1 utilizing its elements 110, 112 and 114.

Step 900 includes monitoring, using at least one receiver positioned at least partially within a chassis of a device, at least one light-based signal that is transmitted from within the chassis of the device.

Step 902 includes determining, based on the monitoring, whether at least one moveable part of the chassis is in a position that provides at least partial access to one or more hardware components located within the chassis.

Step 904 includes initiating one or more automated actions to at least partially secure the device in response to a result of the determining.

In some embodiments, the at least one moveable part may include a panel or a cover, which attaches to the chassis at the designated location, for example, via one or more fasteners and/or one or more magnets. The at least one moveable part may include at least one reflector that is configured to reflect the at least one light-based signal to the at least one receiver when the at least one moveable part is in a different position that restricts the at least partial access to the one or more hardware components located within the chassis. The process may include a step of determining that the at least one moveable part is in the different position based on the at least one receiver receiving at least a portion of the at least one light-based signal. The process may include receiving the at least one light-based signal at the at least one receiver, extracting information from the at least one light-based signal, and initiating a validation process to validate the at least one light-based signal based on the extracted information. In at least one embodiment, the process may include initiating at least one of the one or more automated actions in response to a result of the validation process indicating that the at least one light-based signal is invalid. The process may include a step of generating the information based at least in part on one or more identifiers associated with the one or more hardware components. The one or more automated actions include at least one of transmitting a notification to an external system, automatically shutting down the device, and causing the device to enter a secure state that prevents the device from performing a boot process. The process may include a step of obtaining approval to exit the secure state from at least one of a designated user associated with the device and the external system. In some embodiments, the at least one light-based signal may include a visible light communication signal, such as a LiFi-based signal.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve device security by detecting physical anomalies (e.g., unauthorized physical access and/or tampering) associated with a device using light-based communications. These and other embodiments can provide fewer false positives and more accurate notifications of anomalies relative to conventional techniques that rely on mechanical switches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
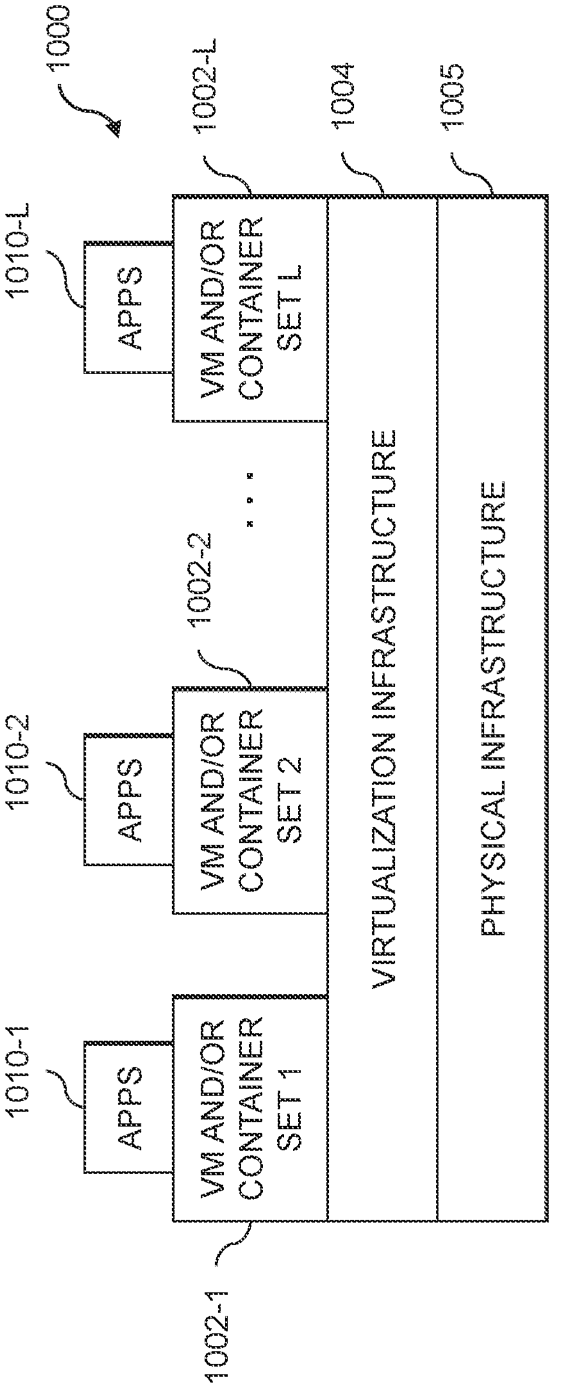
FIGS. 10 and 11 show examples of processing platforms that may be utilized to implement at least a portion of an information processing system in illustrative embodiments.
Figure 11:
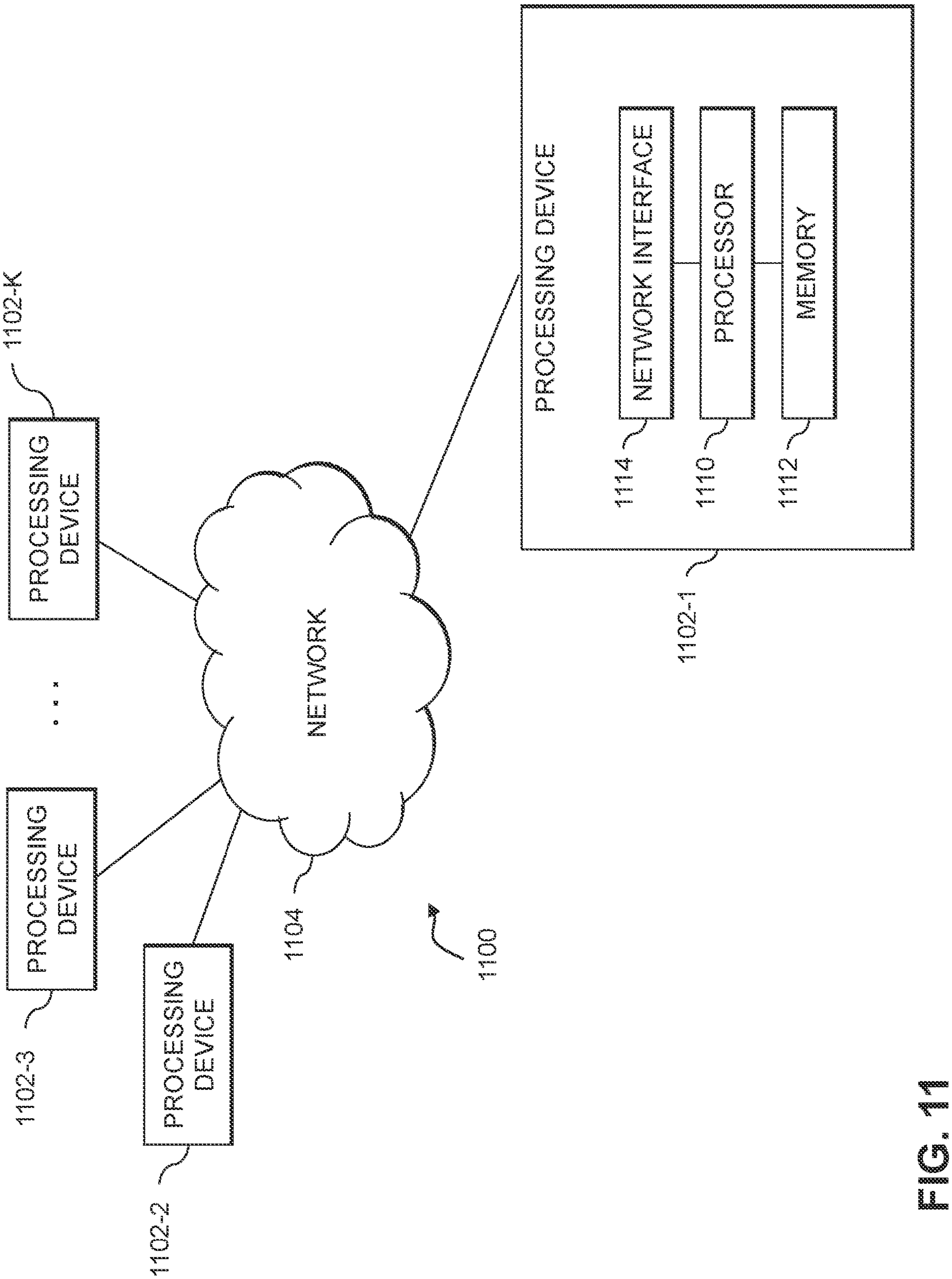

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2 . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2 . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an ASIC, an FPGA or other type of processing circuitry, as well as portions or combinations of such circuitry elements.

The memory 1112 comprises RAM, ROM or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

monitoring, using at least one receiver positioned at least partially within a chassis of a device, at least one light-based signal that encodes data and that is transmitted from within the chassis of the device by at least one transmitter positioned at least partially within the chassis;

determining, based on the monitoring, whether at least one moveable part of the chassis is in a first position that provides at least partial access to one or more hardware components located within the chassis, wherein the at least one moveable part comprises at least one reflector that is at least one of: (i) attached to the at least one moveable part and (ii) at least partially integrated into the at least one moveable part, wherein the at least one reflector is positioned to reflect the at least one light-based signal to the at least one receiver when the at least one moveable part is in a second position that restricts the at least partial access to the one or more hardware components, wherein the determining comprises extracting the data from the at least one light-based signal received at the at least one receiver and initiating a validation process to validate the at least one light-based signal based on the extracted data; and initiating one or more automated actions to at least partially secure the device in response to a result of the determining;

wherein the method is performed by at least one processing device comprising a processor coupled to a memory.

2. The computer-implemented method of claim 1, further comprising:

determining that the at least one moveable part is in the second position based on the at least one receiver receiving at least a portion of the at least one light-based signal.

3. The computer-implemented method of claim 1, further comprising:

initiating at least one of the one or more automated actions in response to a result of the validation process indicating that the at least one light-based signal is invalid.

4. The computer-implemented method of claim 1, comprising:

generating the data encoded in the at least one light-based signal based at least in part on one or more identifiers associated with the one or more hardware components.

5. The computer-implemented method of claim 1, wherein the one or more automated actions comprise at least one of:

transmitting a notification to an external system;

automatically shutting down the device; and causing the device to enter a secure state that prevents the device from performing a boot process.

6. The computer-implemented method of claim 5, comprising:

obtaining approval to exit the secure state from at least one of: a designated user associated with the device and the external system.

7. The computer-implemented method of claim 1, wherein the at least one light-based signal comprises a visible light communication signal.

8. A non-transitory processor-readable storage medium having stored therein program code of one or more software programs, wherein the program code when executed by at least one processing device causes the at least one processing device:

to monitor, using at least one receiver positioned at least partially within a chassis of a device, at least one light-based signal that encodes data and that is transmitted from within the chassis of the device by at least one transmitter positioned at least partially within the chassis;

to determine, based on the monitoring, whether at least one moveable part of the chassis is in a first position that provides at least partial access to one or more hardware components located within the chassis, wherein the at least one moveable part comprises at least one reflector that is at least one of: (i) attached to the at least one moveable part and (ii) at least partially integrated into the at least one moveable part, wherein the at least one reflector is positioned to reflect the at least one light-based signal to the at least one receiver when the at least one moveable part is in a second position that restricts the at least partial access to the one or more hardware components, wherein the determining comprises extracting the data from the at least one light-based signal received at the at least one receiver and initiating a validation process to validate the at least one light-based signal based on the extracted data; and to initiate one or more automated actions to at least partially secure the device in response to a result of the determining.

9. The non-transitory processor-readable storage medium of claim 8, wherein the at least one processing device is further caused:

to determine that the at least one moveable part is in the second position based on the at least one receiver receiving at least a portion of the at least one light-based signal.

10. The non-transitory processor-readable storage medium of claim 8, wherein the at least one processing device is further caused:

to initiate at least one of the one or more automated actions in response to a result of the validation process indicating that the at least one light-based signal is invalid.

11. The non-transitory processor-readable storage medium of claim 8, wherein the at least one processing device is further caused: to generate the data encoded in the at least one light-based signal based at least in part on one or more identifiers associated with the one or more hardware components.

12. An apparatus comprising:

at least one processing device comprising a processor coupled to a memory;

the at least one processing device being configured:

to monitor, using at least one receiver positioned at least partially within a chassis of a device, at least one light-based signal that encodes data and that is transmitted from within the chassis of the device by at least one transmitter positioned at least partially within the chassis;

to determine, based on the monitoring, whether at least one moveable part of the chassis is in a first position that provides at least partial access to one or more hardware components located within the chassis, wherein the at least one moveable part comprises at least one reflector that is at least one of: (i) attached to the at least one moveable part and (ii) at least partially integrated into the at least one moveable part, wherein the at least one reflector is positioned to reflect the at least one light-based signal to the at least one receiver when the at least one moveable part is in a second position that restricts the at least partial access to the one or more hardware components, wherein the determining comprises extracting the data from the at least one light-based signal received at the at least one receiver and initiating a validation process to validate the at least one light-based signal based on the extracted data; and to initiate one or more automated actions to at least partially secure the device in response to a result of the determining.

13. The apparatus of claim 12, wherein the at least one processing device is further configured:

to determine that the at least one moveable part is in the second position based on the at least one receiver receiving at least a portion of the at least one light-based signal.

14. The apparatus of claim 12, wherein the at least one processing device is further configured: to initiate at least one of the one or more automated actions in response to a result of the validation process indicating that the at least one light-based signal is invalid.

15. The apparatus of claim 12, wherein the at least one processing device is further configured: to generate the data encoded in the at least one light-based signal based at least in part on one or more identifiers associated with the one or more hardware components.

16. The apparatus of claim 12, wherein the one or more automated actions comprise at least one of:

transmitting a notification to an external system;

automatically shutting down the device; and causing the device to enter a secure state that prevents the device from performing a boot process.

17. The apparatus of claim 16, wherein the at least one processing device is further configured:

to obtain approval to exit the secure state from at least one of: a designated user associated with the device and the external system.

18. The non-transitory processor-readable storage medium of claim 8, wherein the one or more automated actions comprise at least one of:

transmitting a notification to an external system;

automatically shutting down the device; and causing the device to enter a secure state that prevents the device from performing a boot process.

19. The non-transitory processor-readable storage medium of claim 18, wherein the at least one processing device is further caused:

to obtain approval to exit the secure state from at least one of: a designated user associated with the device and the external system.

20. The non-transitory processor-readable storage medium of claim 8, wherein the at least one light-based signal comprises a visible light communication signal.

* * * * *